United States Patent
Gao et al.

(10) Patent No.: US 11,531,797 B1
(45) Date of Patent: Dec. 20, 2022

(54) VECTOR GENERATION FOR MAXIMUM INSTANTANEOUS PEAK POWER

(71) Applicant: Synopsys, Inc., Mountain View, CA (US)

(72) Inventors: Youxin Gao, Fremont, CA (US); Qing Su, Sunnyvale, CA (US); Mayur Bubna, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/233,126

(22) Filed: Apr. 16, 2021

Related U.S. Application Data

(60) Provisional application No. 63/011,565, filed on Apr. 17, 2020.

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
USPC ........................................................ 716/108
See application file for complete search history.

(56) References Cited

U.S. PATENT DOCUMENTS

| | | | | |
|---|---|---|---|---|
| 5,553,008 A | * | 9/1996 | Huang | G06F 30/33 716/108 |
| 2003/0145296 A1 | * | 7/2003 | Chandra | G06F 30/367 716/112 |
| 2003/0212973 A1 | * | 11/2003 | Lin | G06F 30/367 716/136 |
| 2015/0242560 A1 | * | 8/2015 | Arsovski | G06F 30/3312 716/113 |
| 2015/0363533 A1 | * | 12/2015 | Shroff | H02M 3/158 716/133 |
| 2016/0012171 A1 | * | 1/2016 | Visconti | G06F 30/33 716/122 |

* cited by examiner

*Primary Examiner* — Mohammed Alam
(74) *Attorney, Agent, or Firm* — Lowenstein Sandler LLP

(57) ABSTRACT

A system and method for performing operating state analysis of an integrated circuit (IC) design is disclosed. The method includes simulating a switching operation from a first operating state to a second operating state for one or more cells of the IC design using a plurality of vectors corresponding to one or more user-specified constraints. The method include generating a time-based waveform for each cell of the one or more cells changing an operating state from the first operating state to the second operating state, and based on the generated time-based waveform, identifying one or more operating state changes corresponding to the operating state analysis and associated timing window and cell information. The method includes verifying the one or more operating state changes by the each cell of the one or more cells of the IC design meet the one or more user-specified constraints for generating an analysis report.

19 Claims, 15 Drawing Sheets

FIG. 4
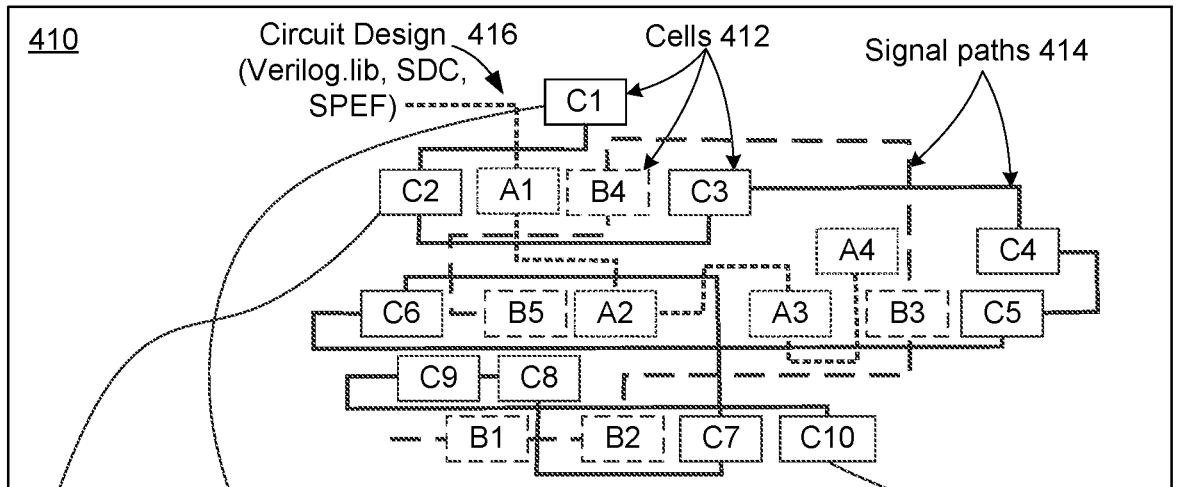
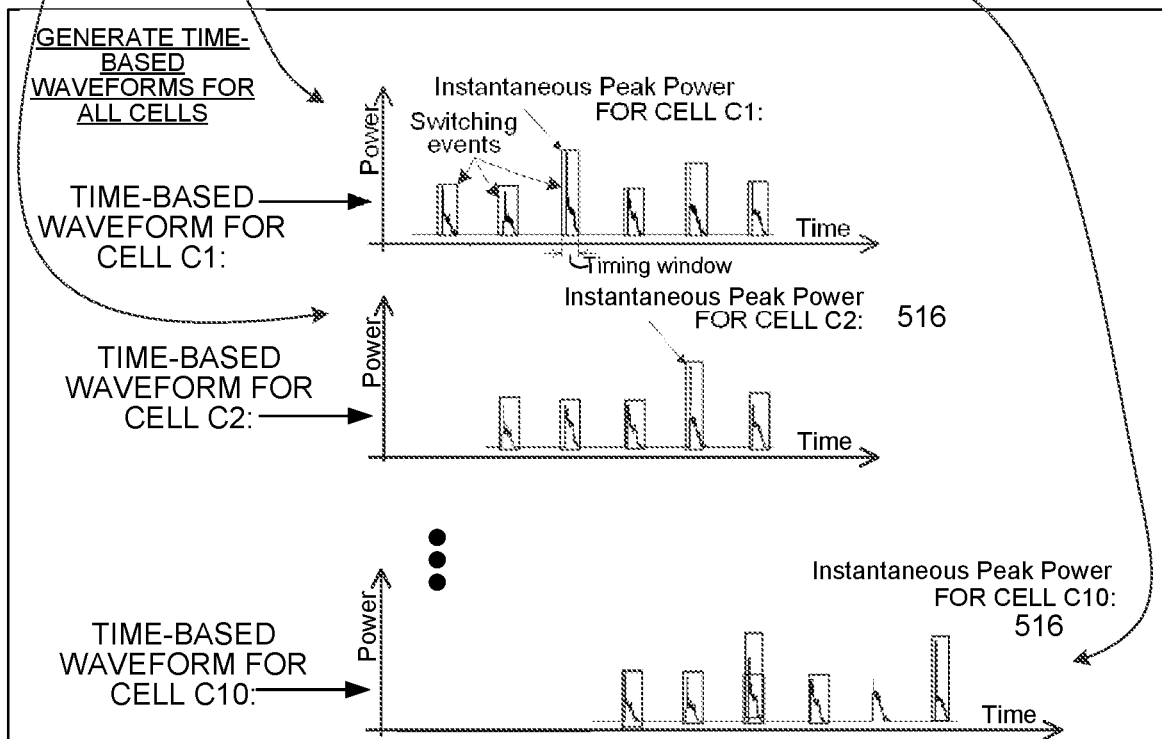
FIG. 5

VECTOR GENERATION FOR MAXIMUM INSTANTANEOUS PEAK POWER

RELATED APPLICATION

The present application claims priority to U.S. Provisional Patent Application No. 63/011,565, filed on Apr. 17, 2020, which is incorporated herein by reference in its entirety for all purposes.

TECHNICAL FIELD

The present disclosure is generally related to integrated circuit design analysis and verification. In particular, the present disclosure is related to the power and voltage usage of an integrated circuit using vectors.

BACKGROUND

In an integrated circuit (IC) design, two key factors for power integrity are worst-case power consumption analysis and voltage drop analysis. An integrated circuit designer, therefore, needs to find out any weakness in the IC design by means of worst-case power consumption analysis and worst-case voltage drop analysis. However, the determination of the worst-case power consumption and/or worst-case voltage drop for the IC design is difficult. One of the approaches that is currently used for assisting IC designers in identifying weaknesses in the IC design find out circuit weakness is to capture real circuit behavior from a real scenario simulation. The output of such simulation may include data on how various cells of the IC design switch over billions of clock cycles. Another approach currently used for assisting IC designer to identify weaknesses in the IC design is logic simulation-based. Based on the given primary inputs, as many as possible input conditions are enumerated and then propagated down along the IC design components. Similar to the first approach, in the logic simulation-based approach, generated data may correspond with a result millions of clock cycles. In a third approach, long vectors are generated based on the simulation data over time for the millions or billions of clock cycles. The generated long vectors are fed into power or voltage drop analysis tools. The third approach is generally used in gate-level analysis tools, in which switching vectors are generated based on switching activity using some algorithm and then followed by native power and voltage drop analysis. In this approach, the switching activity is determined using a random number generator to determine if a cell switches or not. The switch condition is either determined at primary inputs or outputs of registers, then followed by downward logic propagation. In the end, almost all cell states can be determined. The same process can be repeated for multiple clock cycles with different random seeds. Performing power and/or voltage drop analysis using the above-mentioned current approaches is very expensive in terms of time and money.

SUMMARY

In one embodiment, a method is disclosed. The method is being performed by one or more processors. The method includes simulating a switching operation from a first operating state to a second operating state for one or more cells of the IC design using a plurality of vectors corresponding to one or more user-specified constraints. The method includes generating a time-based waveform for each cell of the one or more cells of the IC design changing an operating state from the first operating state to the second operating state during the switching operation. The method includes, based on the generated time-based waveform, identifying one or more operating state changes by the each cell of the one or more cells of the IC design corresponding to the operating state analysis and associated timing window and cell information. The method includes verifying the one or more operating state changes by the each cell of the one or more cells of the IC design meet the one or more user-specified constraints, and generating an analysis report comprising a subset of the plurality of vectors corresponding to the verified one or more operating state changes by the each cell of the one or more cells of the IC design.

In another embodiment, a system for performing operating state analysis of an integrated circuit (IC) design is disclosed. The system includes a memory configured to store operations and one or more processors configured to perform the operations including simulating a switching operation from a first operating state to a second operating state for one or more cells of the IC design using a plurality of vectors corresponding to one or more user-specified constraints. The operations include generating a time-based waveform for each cell of the one or more cells of the IC design changing an operating state from the first operating state to the second operating state during the switching operation. The operations include, based on the generated time-based waveform, identifying one or more operating state changes by the each cell of the one or more cells of the IC design corresponding to the operating state analysis and associated timing window and cell information. The operations include verifying the one or more operating state changes by the each cell of the one or more cells of the IC design meet the one or more user-specified constraints, and generating an analysis report comprising a subset of the plurality of vectors corresponding to the verified one or more operating state changes by the each cell of the one or more cells of the IC design.

In yet another embodiment, a non-transitory, tangible computer-readable device having instructions stored thereon is disclosed. The instructions when executed by at least one computing device, cause the at least one computing device to perform operations for operating state analysis of an integrated circuit (IC) design. The operations include simulating a switching operation from a first operating state to a second operating state for one or more cells of the IC design using a plurality of vectors corresponding to one or more user-specified constraints. The operations include generating a time-based waveform for each cell of the one or more cells of the IC design changing an operating state from the first operating state to the second operating state during the switching operation. The operations include, based on the generated time-based waveform, identifying one or more operating state changes by the each cell of the one or more cells of the IC design corresponding to the operating state analysis and associated timing window and cell information. The operations include verifying the one or more operating state changes by the each cell of the one or more cells of the IC design meet the one or more user-specified constraints, and generating an analysis report comprising a subset of the plurality of vectors corresponding to the verified one or more operating state changes by the each cell of the one or more cells of the IC design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 illustrates simulation of an integrated circuit (IC) design using compliant vectors, in accordance with some embodiments.

FIG. 5 illustrates time-based power consumption waveforms for a plurality of cells on the IC design, in accordance with some embodiments.

To easily identify the discussion of any particular element or act, the most significant digit or digits in a reference number refer to the figure number in which that element is first introduced.

DETAILED DESCRIPTION

Because of the complexity and size of an integrated circuit (IC), it is impossible to enumerate all possible vectors for power and voltage drop analysis generated using the currently known approaches mentioned above in this disclosure to identify the worst case of power consumption and voltage drop analysis. However, a system and method described herein for generating a set of vectors for power and voltage drop analysis may be used to identify the worst-case power and voltage drop analysis.

Figure 1:
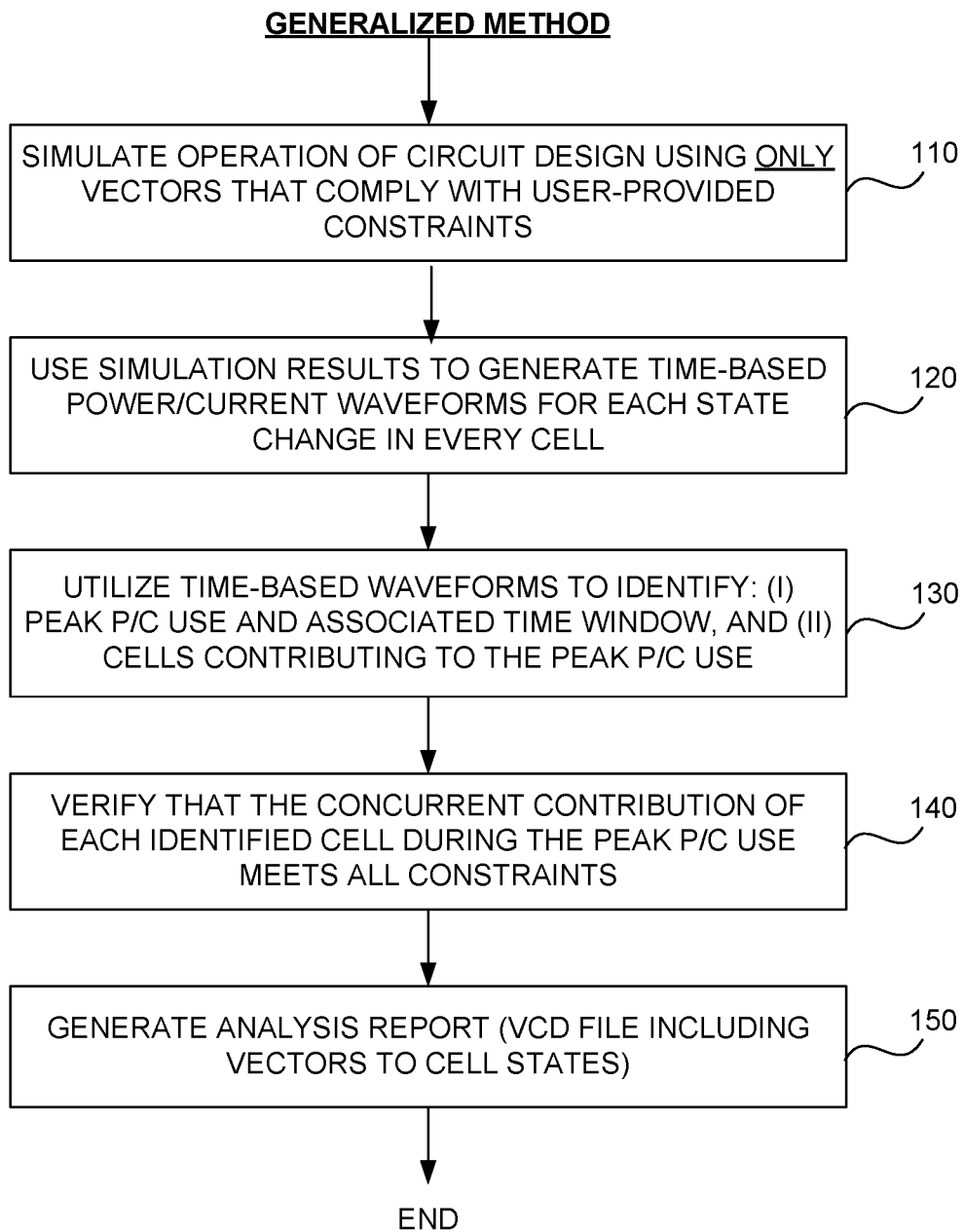
FIG. 1 illustrates a high-level flow diagram of vector generation for power or voltage drop analysis, in accordance with some embodiments.

FIG. 1 illustrates a high-level flow diagram of vector generation for power or voltage drop analysis, in accordance with some embodiments. An integrated circuit may include a plurality of cells. Each cell of the plurality of cells may not switch during a clock cycle. Further, each cell may have a different cell state over time during a different clock cycle. Using maximizing instantaneous peak power and/or voltage drop as an example, the method described herein may start from all cells in the IC design. Accordingly, for power and voltage drop analysis, as shown at 110, the IC design may be simulated, and only vectors generated that meet user-specified constraints are considered for power and voltage drop analysis. By way of a non-limiting example, the user-specified constraints may include information about nets having a constant logic zero or one value, i.e., the nets that do not switch. The user-specified constraint may also include a clock definition that describes a clock frequency, rising and/or falling edges of the clock. The user-specified constraints may also include how often cells switch based on clock gating. By way of non-limiting example, the user-specified constraints may be applied to a subset of the plurality of cells. Accordingly, before vector generation, the user-specified constraints may be applied to the entire IC design such that all cells of the IC design that are under the user-specified constraints are handled according to those constraints. Circuit operations for the IC design are thus simulated in accordance with the user specified constraints.

At 120, time-based power and/or current waveforms may be generated for each state change in the plurality of cells of the IC design. The time-based power and/or current waveforms may be generated based on simulation results of 110 above. For time-based power and/or current waveforms, consumed power and/or current flowing through each cell for each state of the cell may be determined for each timing window of a clock of the cell. All switching conditions for each cell may be enumerated by the user. The power value for each switching condition may then be calculated. Each switching condition in a cell is called a cell state. The power number is then associated with a timing window from which the pin is rising or falling. A timing window consists of minimum and maximum arrival times. In the end, each cell state is represented by a rectangle box, where the width represents a timing window, and the height represents the power. The timing window represents a time interval where the switching condition rise or fall can happen. When it does happen, the power value represents how much power it will consume. In the end, accumulated time-based power can be calculated from all cell states represented by rectangle boxes.

At 130, based on the generated power and/or current waveforms for each state change in the plurality of cells of the IC design, peak power and/or current usage and corresponding timing window may be identified. In addition, one or more cells contributing to the peak power and/or current usage may also be determined based on the generated power and/or current waveforms. The peak power and/or current usage may be determined for a timing window based on power and/or current usage for each cell during the given timing window. Thus, cells and the corresponding cell states during the peak power and/or current usage may be determined. Thus, based on the time-based power waveform, a peak or multiple peaks with time where the peak power consumption occurs can be calculated. For each peak and peak time, all cell states may be analyzed or scanned such that only those cell states whose timing window overlaps with the peak time may be kept to form a list of cell states. The list may be then sorted by power value from the highest power to the lowest power.

At 140, each cell's power and/or current usage during a timing window at which the peak power and/or current usage occurred may be verified to be within the user-specified constraints. If any cell's power and/or current usage during the timing window at which the peak power and/or current usage occurred is not within the user-specified constraints, then the cell and corresponding cell state may also be identified for notifying the user. By way of a non-limiting example, the user may be notified using a notation in a value change dump (VCD) file.

In accordance with some embodiments, the cell states for vector generation may be determined. In this step, the user-specified constraints may be used for vector generation. By way of a non-limiting example, the user-specified constraint may also include a net or nets which will never switch, so they have constant logic zero or one value, clock definition in terms of period, and rising/falling edges, and how often clock gating cells should switch. Before vector generation, the user-specified constraints are honored and propagated first to the whole design such that all cells which are under user-specified constraint are properly handled. From the list of cell states, the cell state from the highest power usage to the smallest power usage may also be identified. Check the cell state against user constraints and current pin conditions propagated so far, and determine if such cell state can be kept or filtered out. If the cell state is to be kept, its pin states will be propagated forward and/or backward. After propagation, if there is no logic conflict found, the cell state is finally kept. Otherwise, the cell state will be filtered out. Such a filtering process is repeated for every cell state in the list until none is left.

At 150, an analysis report including vectors corresponding to each cell state of a plurality of cells of the IC design may be generated. The vectors are generated corresponding to all cell states. The final list of cell states will satisfy both user-specified constraints and logic consistency. The cell states which do not satisfy the user-specified constraints and/or logic consistency may be excluded from the analysis report. The analysis report may be in the VCD file format. By way of a non-limiting example, the analysis report may also be generated using Fast Signal DataBase (FSDB) file format. The analysis report then may be used by the IC designer to determine maximum instantaneous peak power for the IC design. The cell states in the analysis report may be sorted by maximum arrival time from shortest to longest. The vectors in the analysis report may be sorted by order of cell's arrival time. The cell's arrival time may be referenced as an event time in the analysis report.

As stated above, based on the high-level flow diagram shown in FIG. 1, the method starts with calculating power for all enumerated individual cell states for each cell of the IC design. Because the number of individual states from cells in the whole design is less, the worst power usage may also be corresponding to those cell states and cells which are enumerated. Thus, the generation of vectors as described herein using FIG. 1 is faster and more accurate in comparison with the currently known approaches for power and voltage drop analysis. The accuracy of the power and voltage drop analysis based on the vectors generated using a method as described herein using FIG. 1 is because the disclosed method does not use a random number to determine vectors. Thus, power and voltage drop analysis using the method described herein using FIG. 1 may be closer to the worst-case than the other approaches where a random number is used.

By comparison, currently known vector-free based solutions are based on switching activity and use a random number generator to determine if a net switch or not. Therefore, the net with high switching activity has a higher probability to be switched and generate events for vector generation. However, power and/or voltage drop analysis requires vectors that may generate worst-case power or voltage drop. Therefore, as long as nets have simultaneous switching, high instantaneous power or voltage drop may occur regardless of the switching activity. The method described herein in accordance with some embodiments does not use a random number to determine if a net switch or not. Whether a cell switches or not depends on if its power contributes to total accumulated instantaneous power. The method described herein in accordance with some embodiments thus honors the user-specified constraints naturally. It also preserves logic consistency since all logic conflict cell states are filtered in the method.

Figure 2:
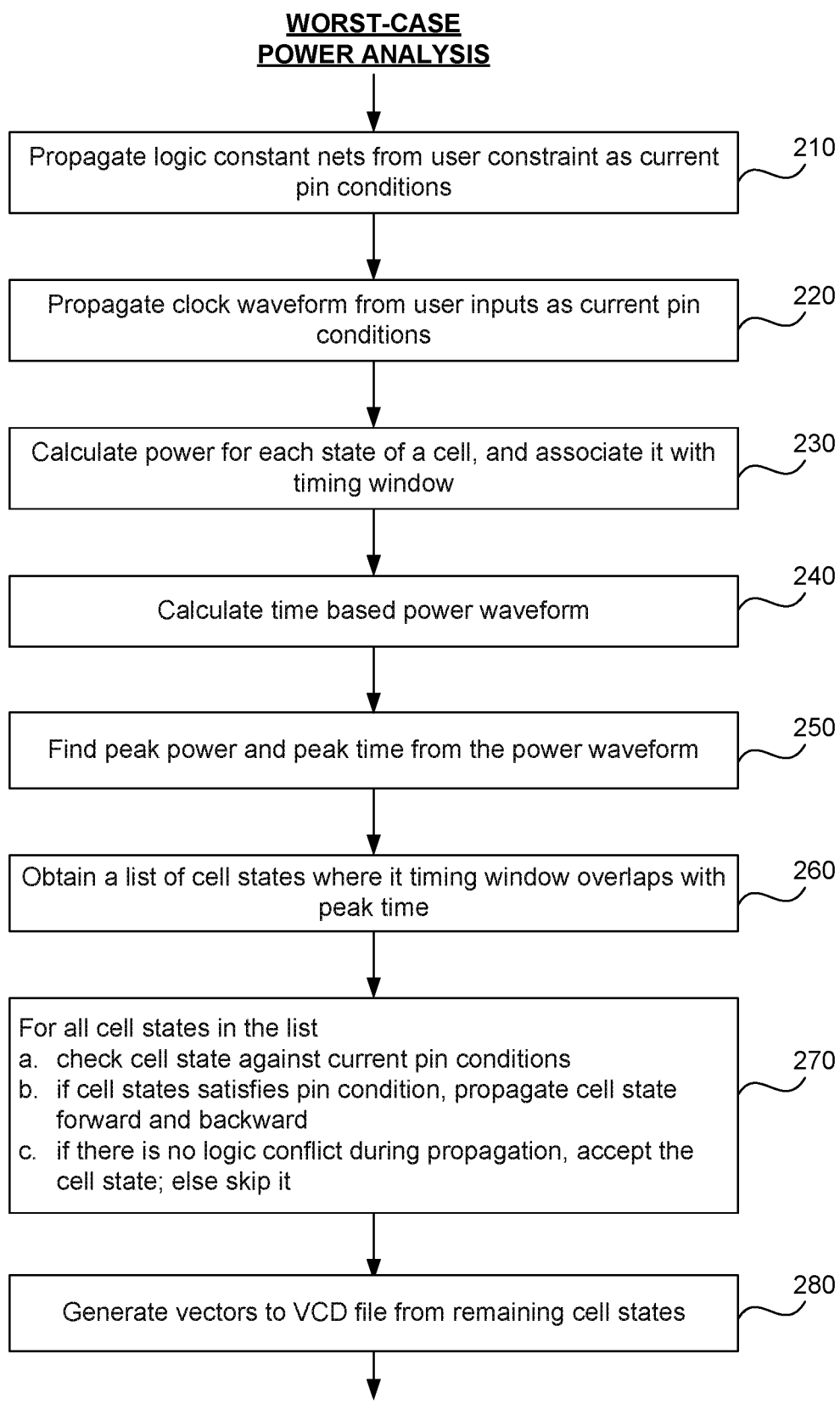
FIG. 2 illustrates a flow diagram of an embodiment of the flow diagram of FIG. 1, in accordance with some embodiments.

FIG. 2 illustrates a flow diagram of an embodiment of the flow diagram of FIG. 1, in accordance with some embodiments. In particular, the embodiment described in FIG. 2 is related to the worst-case or maximum power usage analysis. As shown in FIG. 2, at 210, the user-specified constraints for logic constant for one or more nets may be mapped to one or more pin conditions of one or more cells of the IC design under test. As stated earlier, during the simulation, the user-specified constraints are considered first and applied to the entire IC design. By way of a non-limiting example, the entire IC design may be split into two or more sections; each section may be referenced as a grid. Thus, the entire IC design may be divided into a plurality of grids. The user-specified constraints, therefore, may be applied to one or more grids of the entire IC design. At 220, the user-specified constraints for one or more clock waveforms may be applied to the entire IC design and/or one or more grids of the IC design, as stated above. The rising and/or falling edges of the one or more clock waveforms may cause the one or more cells' switching and power consumption by the one or more cells. Accordingly, at 230, power consumed by the one or more cells during the timing window of the applied one or more clock waveforms may be calculated. Thus, the power consumed by the one or more cells for each state of the cell may be determined and associated with the timing window.

At 240, time-based power waveform may be generated. The time-based power waveform represents the total amount of power used by the one or more cells or grids of the IC design. At 250, based on the time-based power waveform, peak power and corresponding time may also be determined. Further, the one or more cells contributing the peak power may also be identified at 260. Since the peak power is a result of cumulative power usage by the one or more cells of the IC design, the list of cell states of the one or more cells contributing to the peak power use may also be determined using the time-based power waveform.

At 270, the list of cell states may be checked against current pin conditions for the one or more pins of the one or more cells based on the user-specified constraints. If a cell state from the list of cell states is in conformance with the user-specified constraints, then the cell state may be propagated in forward and/or backward direction. Further, if the cell state's propagation does not cause any logic conflict, then the cell state may be accepted for generating vectors. Otherwise, the cell state may be excluded from generating vectors.

At 280, an analysis report including generated vectors corresponding to the accepted cell states may be generated. The analysis report may be in VCD or FSDB file format, as stated above.

Figure 3:
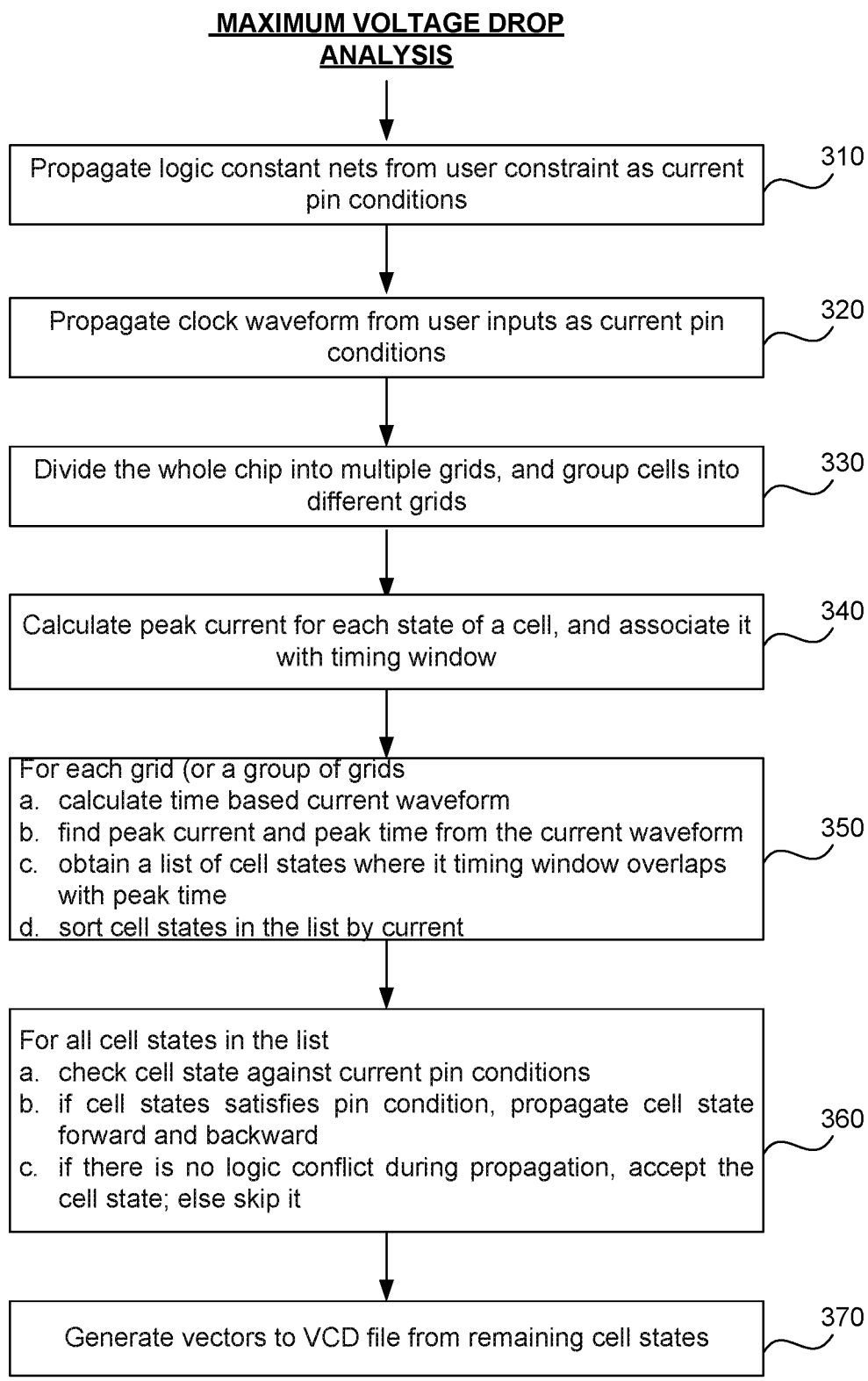
FIG. 3 illustrates a flow diagram of another embodiment of flow diagram of FIG. 1, in accordance with some embodiments.

FIG. 3 illustrates a flow diagram of another embodiment of the flow diagram of FIG. 1, in accordance with some embodiments. In particular, the embodiment described in FIG. 3 is related to the worst-case or maximum voltage drop analysis. As shown in FIG. 3, at 310, the user-specified constraints for logic constant for one or more nets may be mapped to one or more pin conditions of one or more cells of the IC design under test. As stated earlier, during the simulation, the user-specified constraints are considered first and applied to the entire IC design. By way of a non-limiting example, at 330, the entire IC design may be split into two or more sections; each section may be referenced as a grid. Thus, the entire IC design may be divided into a plurality of grids. The user-specified constraints, therefore, may be applied to one or more grids of the entire IC design. Therefore, when the user-specified constraints for one or more clock waveforms may be applied to the entire IC design and/or one or more grids of the IC design, as stated above, the rising and/or falling edges of the one or more clock waveforms may cause the one or more cells' switching, and an electrical current to flow through the one or more cells. Accordingly, at 340, the electrical current flowing through the one or more cells during the timing window of the applied one or more clock waveforms may be calculated. Accordingly, the peak electrical current through the one or more cells for each state of the cell may be determined and associated with the timing window.

At 350, a time-based current waveform may be generated for one or more grids or the entire IC design. The time-based current waveform represents the total amount of electrical current flowing through the one or more cells or grids of the IC design. Based on the time-based current waveform, peak current and corresponding time may also be determined. Further, the one or more cells or grids contributing to the peak current drawn may also be identified at 350. Since the peak current is a result of cumulative current drawn by the one or more cells or grids of the IC design, the list of cell states of the one or more cells contributing to the peak current may also be determined using the time-based current waveform.

At 360, the list of cell states may be checked against current pin conditions for the one or more pins of the one or more cells based on the user-specified constraints. If a cell state from the list of cell states is in conformance with the user-specified constraints, then the cell state may be propagated in forward and/or backward direction. Further, if the propagation of the cell state does not cause any logic conflict, then the cell state may be accepted for generating vectors. Otherwise, the cell state may be excluded from generating vectors.

At 370, an analysis report including generated vectors corresponding to the accepted cell states may be generated. The analysis report may be in VCD or FSDB file format, as stated above. Thus, the analysis report helps the IC designer identify maximum voltage drop for the IC design and corresponding cell states for the one or more IC design cells. There may be a plurality of VCD or FSDB files generated, and each VCD or FSDB file may correspond with a single clock cycle.

In accordance with some embodiments, the vector generation for maximum voltage drop analysis differs from the vector generation for maximum power usage in two ways. First, instead of calculating power for each cell state in the design, a current waveform may be calculated for each cell state. Second, a time-based current waveform may be generated from a group of cells in the same neighborhood instead of all IC design cells. As stated above, in order to achieve this, the whole IC design may be divided into multiple grids, and then cells are grouped into different grids based on their physical location on the IC. By way of a non-limiting example, vector generation may be performed at each grid or from multiple grids altogether.

In accordance with some embodiments, by way of a non-limiting example, the steps described above using FIG. 2 and/or FIG. 3 above may also be applied to generate vectors to achieve maximum voltage drop feedback on a timing path such that its delay impact is the worst. In this disclosure, when the vectors are generated for maximum power usage, the cost function is therefore power. Similarly, when the vectors are generated for maximum voltage drop, the cost function is, therefore, peak current, and when the vector is generated for maximum voltage drop feedback, then the cost function is voltage drop induced delay. The vectors for the maximum voltage drop feedback may be generated for a group of cells in the same neighborhood or vicinity on the IC along the timing path.

FIG. 4 illustrates simulation of an integrated circuit (IC) design using compliant vectors, in accordance with some embodiments. As stated above and as shown in FIG. 4, an IC design 416 described using a hardware description language, for example, Verilog, etc., may include a plurality of cells 412. The plurality of cells 412 may be connected via a plurality of signal paths 414. When the clock waveform, according to the user-specified constraints, is applied to one or more cells of the plurality of cells 412, it may cause switching of the nets of the one or more cells of the plurality of cells 412. The switching of the nets may cause the power usage and/or current flow through the one or more cells. Further, as stated above, various cells may be grouped into one or more sections called grids. The cells may be grouped into a grid based on their location on the IC design.

Based on the cell switching, cells may be coupled, for example, in temporal and/or spatial relation, to a timing-critical path. All cells may cause some voltage drop and their IR sensitivity may be calculated as the cell switches during a rising and/or a falling edge of a clock. Further, delay for the critical timing path may also be determined. Accordingly, by way of a non-limiting example, switching vectors in addition to maximum power usage vectors may also be determined. The switching vectors may describe timing degradation for each switching event. As stated above, vectors that do not conform to the user-specified constraints may be excluded and may not be included in the analysis report. By way of a non-limiting example, the user-specified constraints may be related to fanout, reset logic, integrated clock gating (ICG) efficiency, scanning mode, etc.

FIG. 5 illustrates time-based power consumption waveforms for a plurality of cells on the IC design, in accordance with some embodiments. As stated above and as shown in FIG. 5, timer-based power consumption waveforms 512, 514, and 516 are shown. The power consumption waveforms 512, 514, and 516 are associated with cells C1, C2, and C10, for example. For each cell, C1, C2, and C10, the power consumption waveform shows power used over time over a plurality of clock cycles. The power may be used by a cell as a cell state switches during a rising and/or a falling of the applied clock waveform. The power used may then be represented as a rectangle, in which the height of the rectangle represents the amount of power used, and the width represents a timing window.

Figure 6:
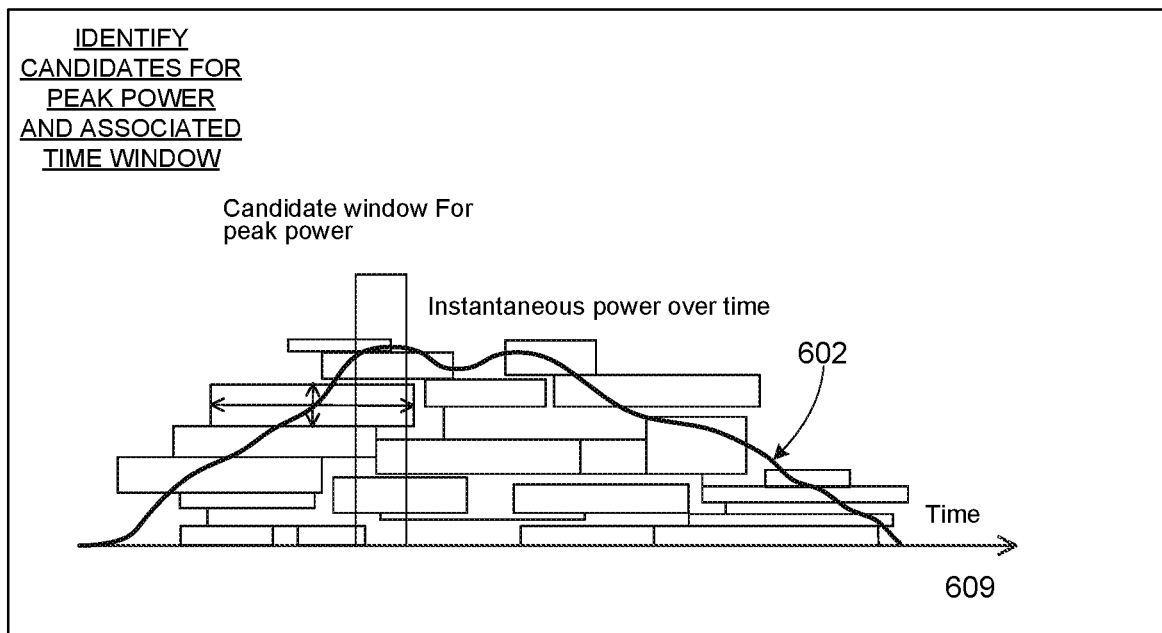
FIG. 6 illustrates peak power consumption over time calculated in accordance with some embodiments.

FIG. 6 illustrates peak power consumption over time calculated in accordance with some embodiments. The time-based power waveforms shown in FIG. 5 for a plurality of cells are shown in FIG. 6 over time along X-axis 604. Since the time-based power waveforms for the plurality of cells are stacked on each other over time along the X-axis, the power consumption waveform 602 may be generated for the entire IC design and/or the plurality of cells that shows the total power being consumed at a given time. As shown in FIG. 6, the power consumption waveform 602 thus may be used to identify the peak power, cells contributing to the peak power, and cell states and corresponding time when the peak power usage occurs may also be identified.

Figure 7:
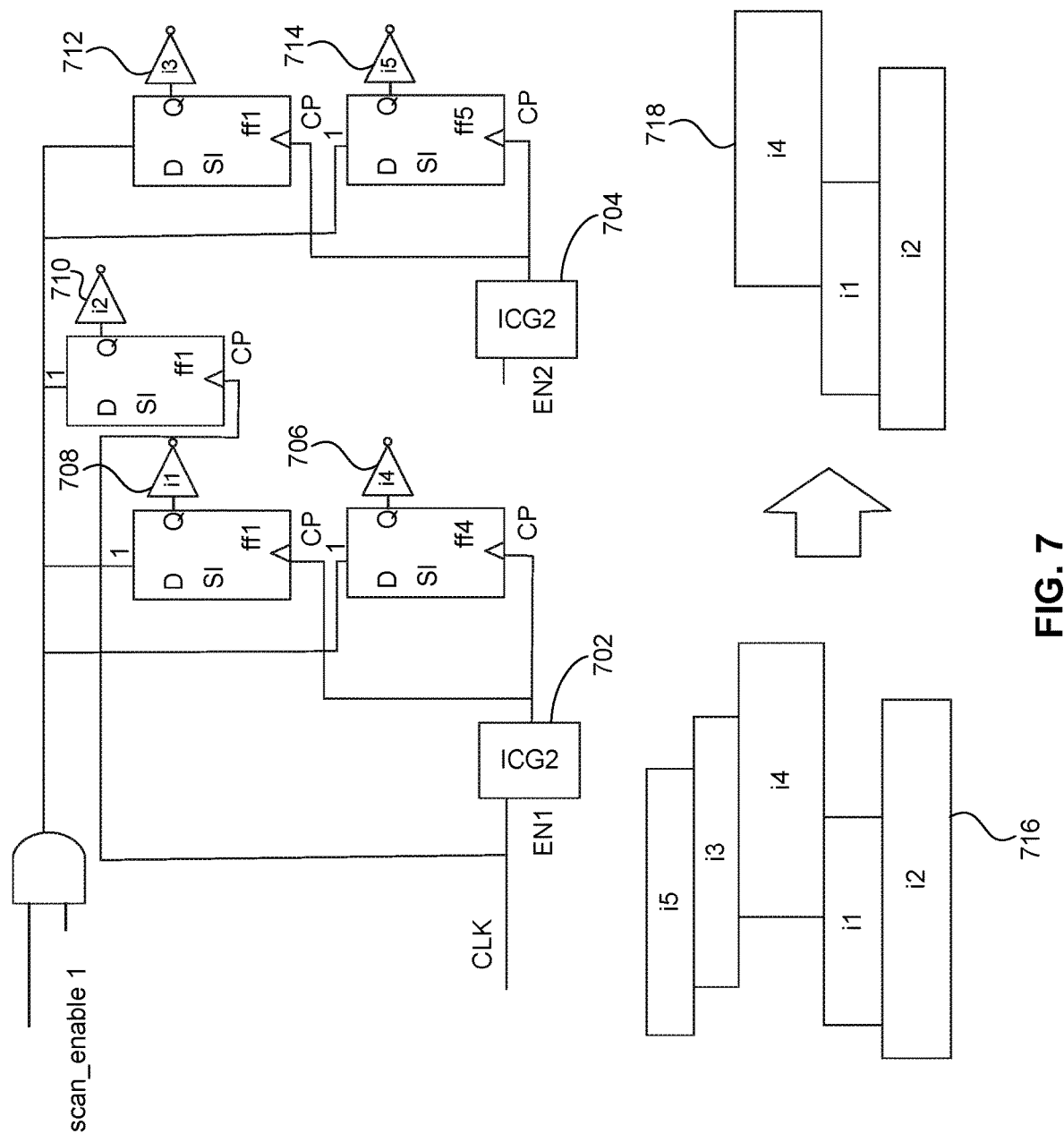
FIG. 7 illustrates an application of user constraints for vector generation, in accordance with some embodiments.

FIG. 7 illustrates an application of user constraints for vector generation in accordance with some embodiments. An example of user constraints for vector generation may be ICG efficiency of 50 percent and below. Without ICG efficiency constraint, all inverters may switch in a way that may contribute to maximum instantaneous peak power usage. As shown in FIG. 7, inverters i1 708, i2 710, and i4 706 are triggered by ICG1 702, and inverters i3 712 and i5 714 are triggered by ICG2 704. Accordingly, the inverters i1 708, i2 710, and i4 706 may cause power consumption according to the enable signal at the ICG1 702 and a rising and/or a falling edge of the clock signal CLK. Similarly, the inverters i3 712 and i5 714 may cause power consumption according to the enable signal at the ICG2 704 and the clock signal CLK. As shown in FIG. 7, without the user-specified constraints describing maximum instantaneous peak power, all inverters may switch simultaneously, causing maximum simultaneous peak power as shown by 716. By way of a non-limiting example, the user-specified constraints may limit the maximum simultaneous peak power usage to 50 percent below. Since the ICG2 704 triggered vectors for i3 712 and i5 714 consume less instantaneous peak power in comparison with the ICG1 702 triggered vectors i1 708, i2 710, and i4 706, the ICG2 704 triggered vectors may be excluded from consideration. And vectors may therefore be generated based on simultaneous power usage of inverters i1 708, i2 710, and i4 706, as shown by 718.

Figure 8A:
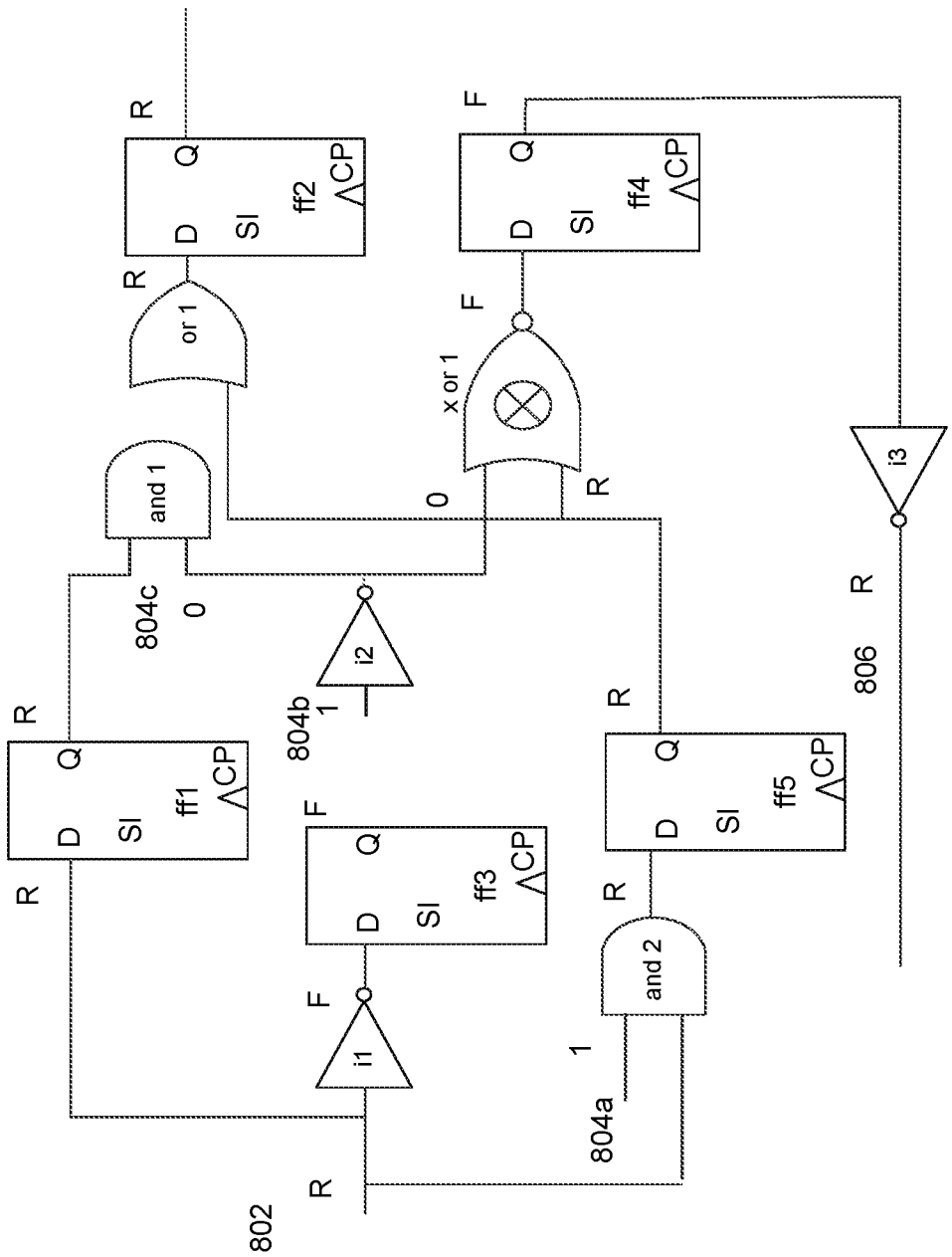
FIG. 8A illustrates logic correlation and event propagation for maximum instantaneous peak power determination in accordance with some embodiments.

FIG. 8A illustrates logic correlation and event propagation for maximum instantaneous peak power determination in accordance with some embodiments. By way of a non-limiting example, the user-specified constraints may require that an input signal at an inverter i1 be a rising signal. Accordingly, when an event R 802 is rising at the inverter i1, the event is propagated forward to other flip flops. As shown in FIG. 8A, some pins may have a constant logic. Accordingly, a voltage level at those pings having a constant logic may remain either 1 or 0. After event propagation, the resulting vectors for the circuit shown in FIG. 8A may have a logic correlation for the event R at the inverter i1, flip flop ff1, an OR gate or1, flip flop ff2, flip flop ff3, an exclusive OR gate XOR1, flip flops ff4 and ff5, and an inverter i3. Accordingly, vectors may be generated that satisfy the logic correlation, and only those events that satisfy the user-specified constraints for logic correlation may be propagated in forward and/or reverse direction.

Figure 8B:
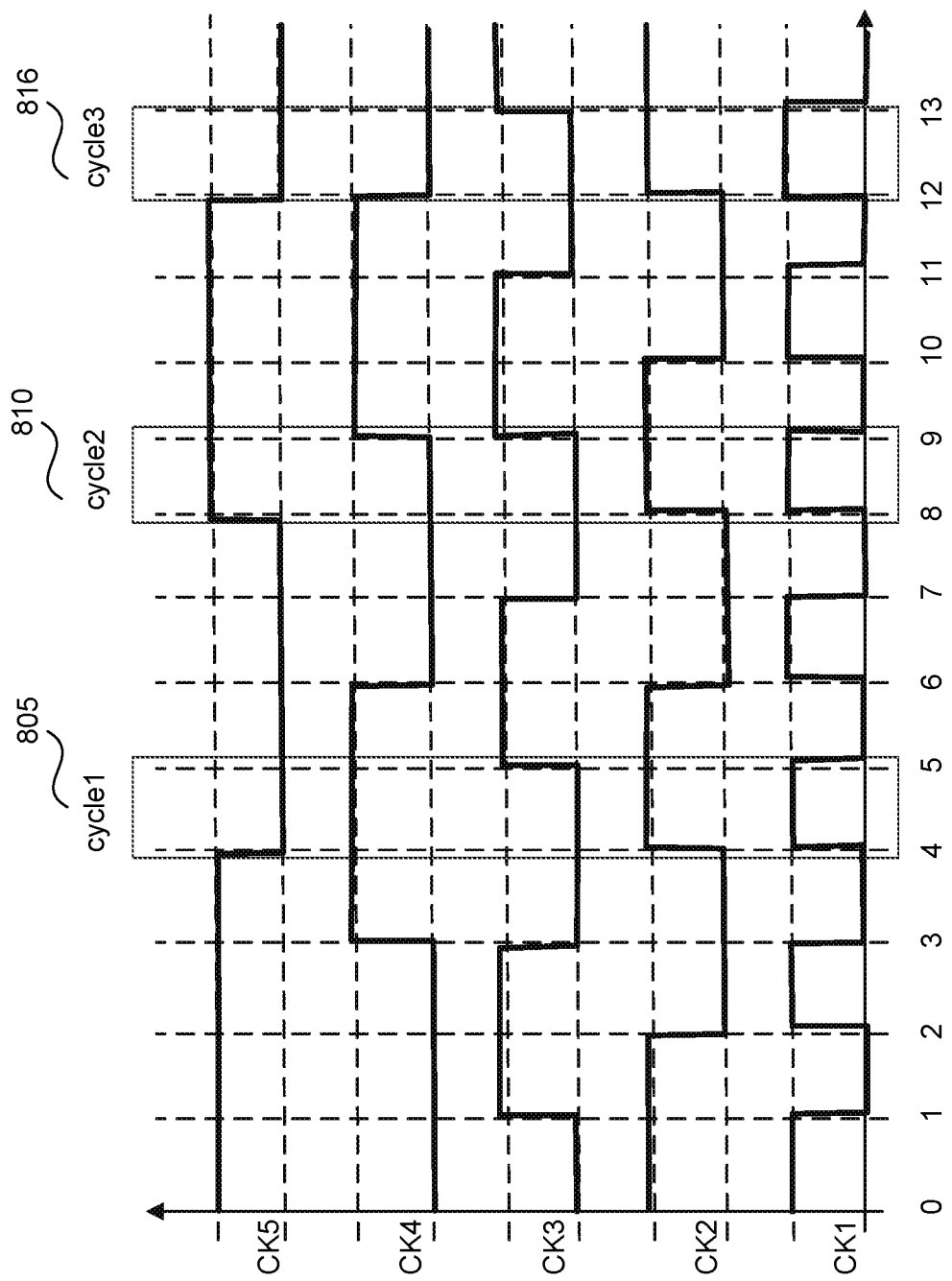
FIG. 8B illustrates a graph showing power consumption for a plurality of clock cycles over time, in accordance with some embodiments.

FIG. 8B illustrates a graph showing power consumption for a plurality of clock cycles over time, in accordance with some embodiments. By way of a non-limiting example, it is assumed that all cells are clock cells, and there are no data cells in an IC design for which power consumption for a plurality of clock cycles, as shown in FIG. 8B. Assuming that cell switching occurs at a rising edge of a clock, as shown in FIG. 8B, worst or maximum simultaneous power consumption may occur during cycles cycle1 808, cycle2 810, and cycle3 812. Therefore, according to the user-specified constraints, during vectors generation, only clock cycles 808, 810, and 812 may be considered for all the clocks. All other clock cycles may be ignored since they do not conform to the user-specified constraints. However, when the analysis report is generated for the vector for cycles 808, 810, and 812, the output VCD files may not look coherent. By way of a non-limiting example, to generate an analysis report including vectors showing coherent logic, dummy extra clock cycles may be generated. As a result, a single VCD or FSDB file may be generated.

Figure 9:
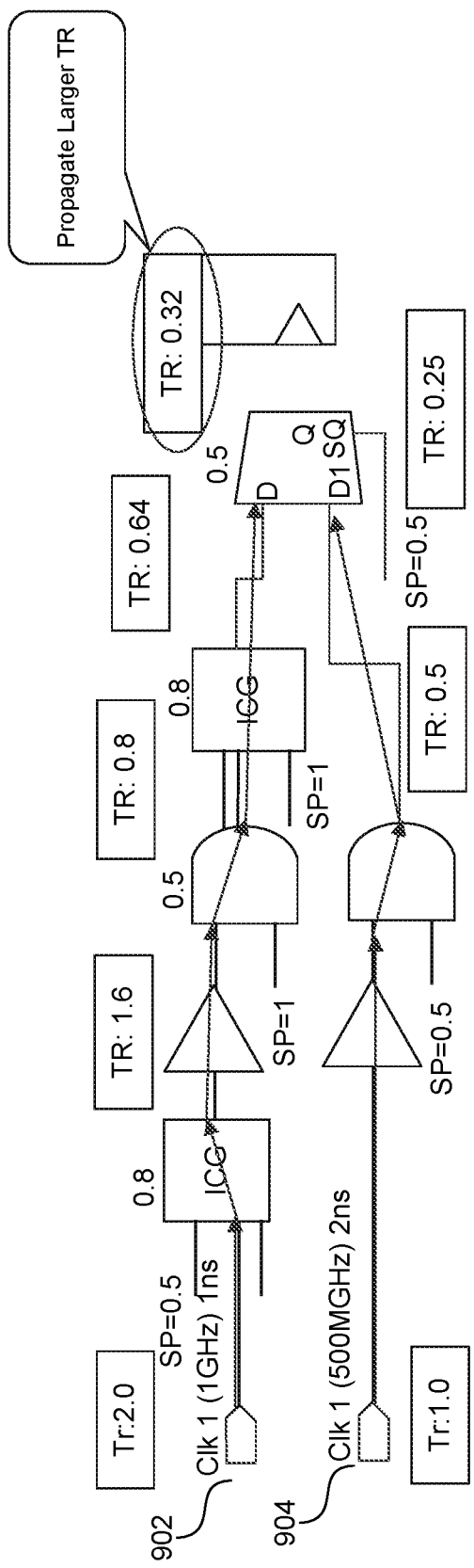
FIG. 9 illustrates activities propagation over a plurality of clock paths, in accordance with some embodiments.

FIG. 9 illustrates activities propagation over a plurality of clock paths, in accordance with some embodiments. By way of a non-limiting example, the user-specified constraints may include propagation of events over a plurality of clock paths. The user-specified constraints, in this case, may specify how the event propagation should be delayed. As shown in FIG. 9, a clock 902 is a 1 GHz clock, and another clock 904 is 500 MHz clock. When an option, for example, "set_power_analysis_options-through_mode" is enabled then the events are propagated along the plurality of clock paths. The derating factors may be specified for components along the clock path to achieve maximum clock transition at the destination.

Figure 10:
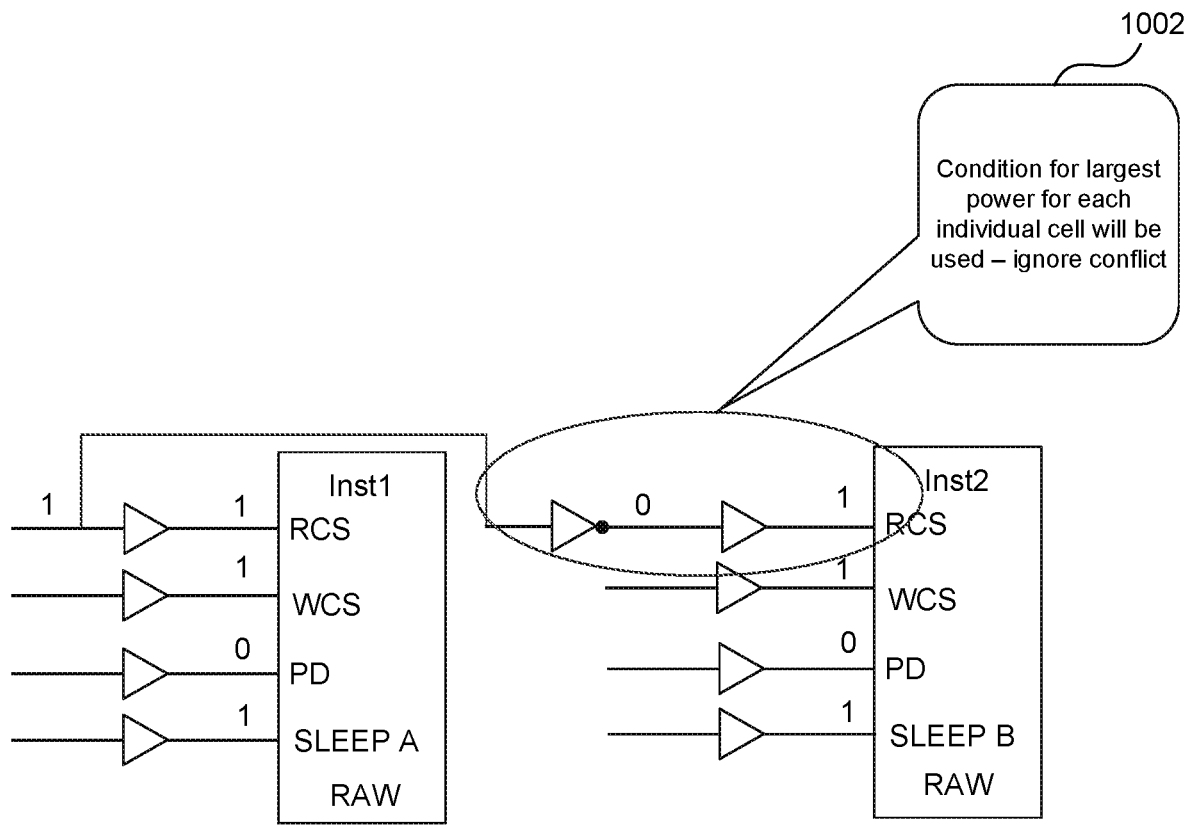
FIG. 10 illustrates conflict resolution for vector generation, in accordance with some embodiments.

FIG. 10 illustrates conflict resolution for vector generation, in accordance with some embodiments. By way of a non-limiting example, the user-specified constraints may include one or more conditions corresponding to the worst-case internal energy consumption for a plurality of instances. The user-specified constraints 1002 may require propagated clock transition and signal values to the nets to be ignored, which are part of the one or more conditions corresponding to the worst-case internal energy consumption.

Figure 11:
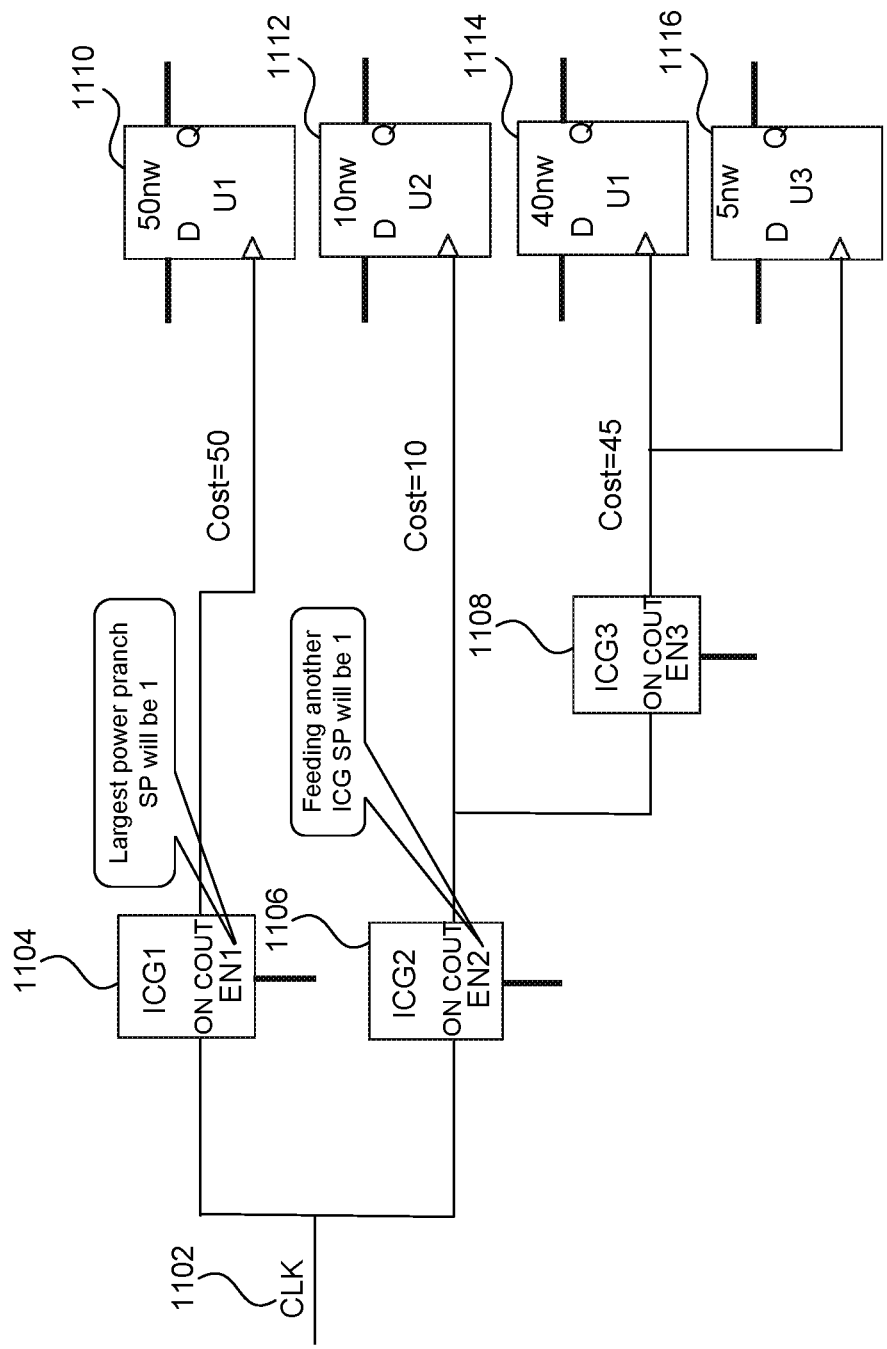
FIG. 11 illustrates maximization of clock network power, in accordance with some embodiments.

FIG. 11 illustrates maximization of clock network power, in accordance with some embodiments. By way of a non-limiting example, the user-specified constraints may include worst-case clock network power and user-specified target power consumption by the IC design, one or more cells, or one or more grids of the IC design. The IC design shown in FIG. 11, for example, may include a clock CLK 1102, ICG1 1104, ICG2 1106, ICG3 1108, and flip flops 1110, 1112, 1114, and 1116. The cost function or the parameter for this user-specified constraint may be internal energy of a plurality of endpoints. As shown in FIG. 11, an ICG feeding another ICG may be enabled with SP of value 1.

Figure 12:
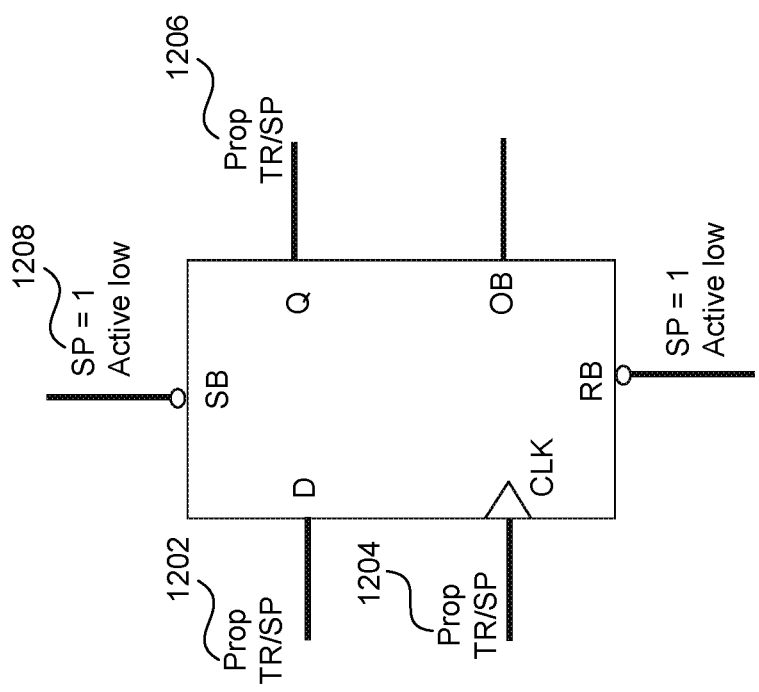
FIG. 12 illustrates a D flip flop with active low preset and clear, in accordance with some embodiments.

FIG. 12 illustrates a D flip flop with active low preset and clear, in accordance with some embodiments. By way of a non-limiting example, the user-specified constraints may include how control pins may be set to enable data to propagate output. In FIG. 12, a clock pin 1204, data pins 1202 and 1206, and control pins 1208 and 1210 are shown. The control pins may be handled based on the hardware description language specifying enabling signal's preset and clear. Data pins may get TR and SP through the user annotated or regular propagation and annotation. Clock pins may get TR and SP through node clock activity propagation.

Figure 13:
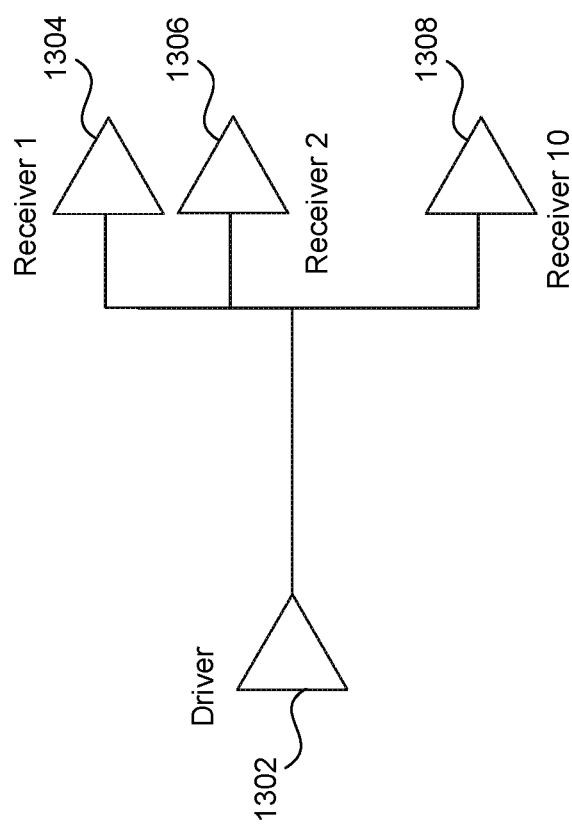
FIG. 13 illustrates handling of high fanout net (HFN), in accordance with some embodiments.

FIG. 13 illustrates handling of high fanout net, in accordance with some embodiments. By way of a non-limiting example, the user-specified constraints may include high fanout net (HFN) handling. In an IC design, unbuffered nets may cause large power consumption, which may mask real power issues during early design stages before clock tree synthesis (CTS) or buffering. The user-specified constraints may define a limit for HFN. For example, the HFN may be set at 10. Accordingly, all nets with 10 or more pins may be defined as HFN. For a driver 1302 and receivers 1304, 1306, and 1308, calculation of power may be based on leakage only. Slew and load calculation of a net that is identified as having HFN may be disabled according to the user-specified constraints.

Figure 14:
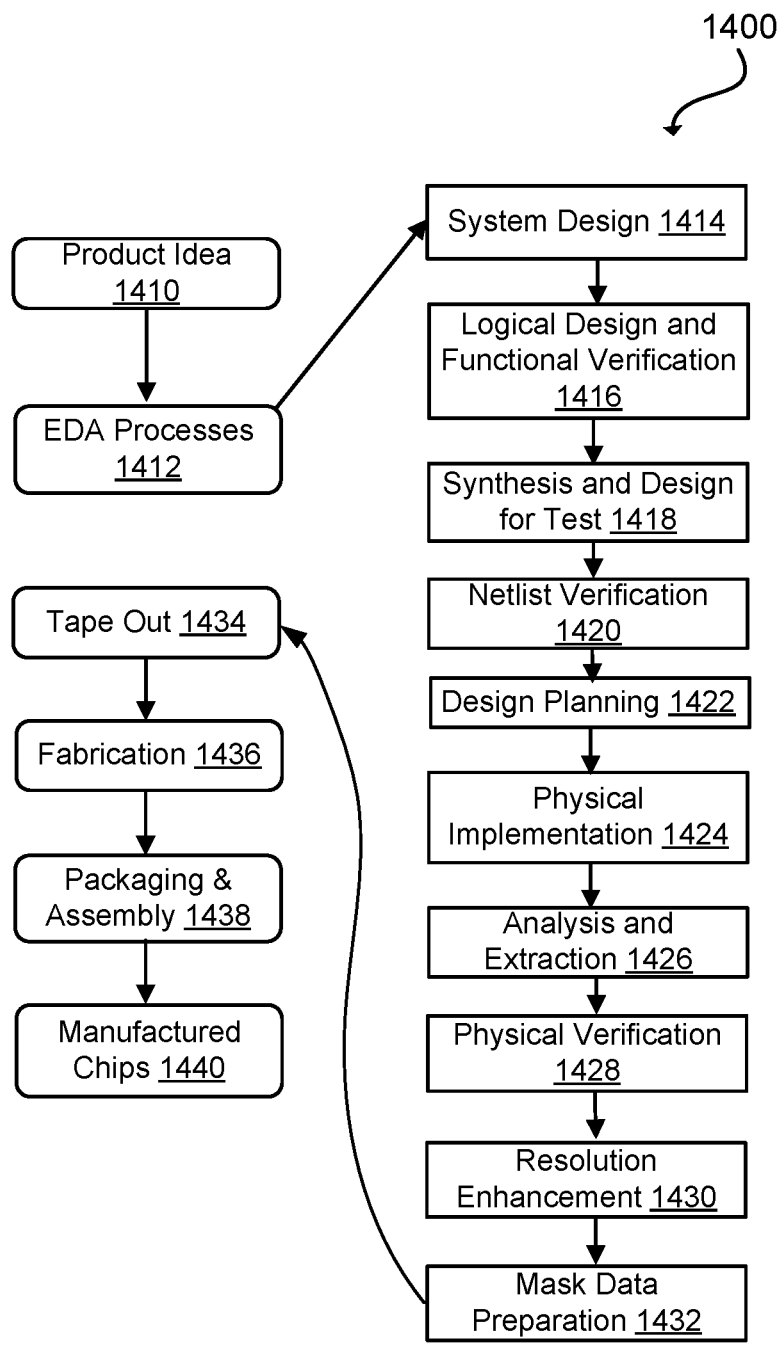
FIG. 14 illustrates a flow-chart of various processes used during the design and fabrication of an integrated circuit in accordance with some embodiments.

FIG. 14 illustrates an example set of processes 1400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1410 with information supplied by a designer, information which is transformed to create an article of manufacture that uses a set of EDA processes 1412. When the design is finalized, the design is taped-out 1434, which is when artwork (e.g., geometric patterns) for the integrated circuit is sent to a fabrication facility to manufacture the mask set, which is then used to manufacture the integrated circuit. After tape-out, a semiconductor die is fabricated 1436 and packaging and assembly processes 1438 are performed to produce the finished integrated circuit 1440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 14. The processes described by be enabled by EDA products (or tools).

During system design 1414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1420, the netlist is checked for compliance with timing constraints and for correspondence with the HDL code. During design planning 1422, an overall floor plan for the integrated circuit is constructed and analyzed for timing and top-level routing.

During layout or physical implementation 1424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1426, the circuit function is verified at the layout level, which permits refinement of the layout design. During physical verification 1428, the layout design is checked to ensure that manufacturing constraints are correct, such as DRC constraints, electrical constraints, lithographic constraints, and that circuitry function matches the HDL design specification. During resolution enhancement 1430, the geometry of the layout is transformed to improve how the circuit design is manufactured.

During tape-out, data is created to be used (after lithographic enhancements are applied if appropriate) for production of lithography masks. During mask data preparation 1432, the 'tape-out' data is used to produce lithography masks that are used to produce finished integrated circuits.

A storage subsystem of a computer system (such as computer system 1500 of FIG. 15) may be used to store the programs and data structures that are used by some or all of the EDA products described herein, and products used for development of cells for the library and for physical and logical design that use the library.

Figure 15:
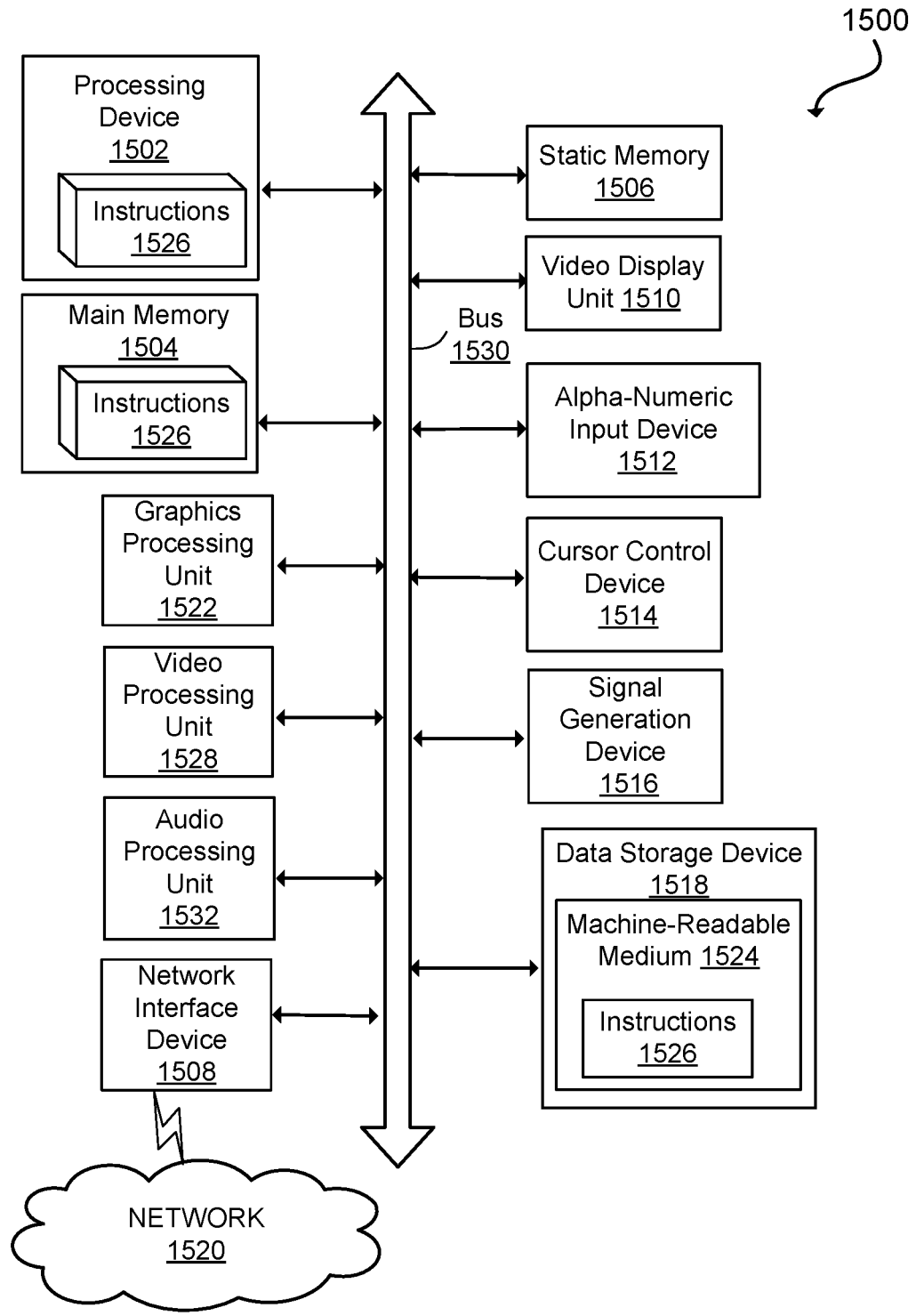
FIG. 15 illustrates a diagram of an example computer system in which embodiments of the present disclosure may operate.

FIG. 15 illustrates an example machine of a computer system 1500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application-specific integrated circuit (ASIC), a field-programmable gate array (FPGA), a digital signal processor (DSP), network processor, or the like. The processing device 1502 may be configured to execute instructions 1526 for performing the operations and steps described herein.

The computer system 1500 may further include a network interface device to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and an audio processing unit 1532.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1404 and/or within the processing device 1502 during execution thereof by the computer system 1500, the main memory 1504, and the processing device 1502 also constituting machine-readable storage media.

In some implementations, instructions 1526 include instructions to implement functionality corresponding to the present disclosure. While the machine-readable storage medium 1524 is shown in an example implementation to be a single medium, the term "machine-readable storage medium" should be taken to include a single medium or multiple media (e.g., a centralized or distributed database and/or associated caches and servers) that store the one or more sets of instructions. The term "machine-readable storage medium" shall also be taken to include any medium that is capable of storing or encoding a set of instructions for execution by the machine and that cause the machine and the processing device 1502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system or similar electronic computing device that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product or software that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. The disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A computer-implemented method for performing operating state analysis of an integrated circuit (IC) design, the method comprising:
   simulating a switching operation from a first operating state to a second operating state for one or more cells of the IC design using a plurality of vectors corresponding to one or more user-specified constraints;
   generating a time-based waveform for each cell of the one or more cells of the IC design changing an operating state from the first operating state to the second operating state during the switching operation;
   based on the generated time-based waveform, identifying one or more operating state changes by the each cell of the one or more cells of the IC design corresponding to the operating state analysis and associated timing window and cell information;
   verifying the one or more operating state changes by the each cell of the one or more cells of the IC design meet the one or more user-specified constraints; and
   generating an analysis report for a clock cycle comprising a subset of the plurality of vectors corresponding to the verified one or more operating state changes by the each cell of the one or more cells of the IC design.

2. The computer-implemented method of claim 1, wherein the operating state analysis performed is maximum simultaneous power consumption by the one or more cells of the IC design.

3. The computer-implemented method of claim 1, wherein the operating state analysis performed is maximum voltage drop by the one or more cells of the IC design.

4. The computer-implemented method of claim 1, wherein the operating state analysis performed is timing path analysis for one or more clock paths of the IC design.

5. The computer-implemented method of claim 1, wherein the verifying the one or more operating state changes comprises:
   verifying a cell state matches to pin conditions according to the user-specified constraints for a cell state for the each cell of the one or more cells of the IC design; and
   propagating the cell state upon verification of the cell state according to the user-specified constraints.

6. The computer-implemented method of claim 5, wherein the verifying the one or more operating state changes further comprises:
   verifying a logic conflict during propagation of the cell state; and
   excluding the cell state that causes the logic conflict during propagation of the cell state.

7. The computer-implemented method of claim 1, wherein the generating the analysis report comprises generating the analysis report in a value change dump (VCD) format or a fast signal data base (FSDB) format.

8. The computer-implemented method of claim 1, wherein the user-specified constraints comprises high fan out (HFN), reset logic, and integrated clock gating (ICG) efficiency.

9. The computer-implemented method of claim 1, wherein the generating the analysis report comprises generating the analysis report for a plurality of clock cycles.

10. The computer-implemented method of claim 9, wherein one or more clock cycles of the plurality of clock cycles are non consecutive.

11. A system for performing operating state analysis of an integrated circuit (IC) design, comprising:
    a memory configured to store operations; and
    one or more processors configured to perform the operations, the operations comprising:
       simulating a switching operation from a first operating state to a second operating state for one or more cells of the IC design using a plurality of vectors corresponding to one or more user-specified constraints;
       generating a time-based waveform for each cell of the one or more cells of the IC design changing an operating state from the first operating state to the second operating state during the switching operation;
       based on the generated time-based waveform, identifying one or more operating state changes by the each cell of the one or more cells of the IC design corresponding to the operating state analysis and associated timing window and cell information;
       verifying the one or more operating state changes by the each cell of the one or more cells of the IC design meet the one or more user-specified constraints; and
       generating an analysis report for a clock cycle comprising a subset of the plurality of vectors corresponding to the verified one or more operating state changes by the each cell of the one or more cells of the IC design.

12. The system of claim 11, wherein the operating state analysis performed for the IC design comprises one of a maximum simultaneous power consumption by the one or more cells of the IC design, maximum voltage drop by the one or more cells of the IC design, and timing path analysis for one or more clock paths of the IC design.

13. The system of claim 11, wherein for the verifying the one or more operating state changes, the operations comprise:
    verifying a cell state matches to pin conditions according to the user-specified constraints for a cell state for the each cell of the one or more cells of the IC design; and
    propagating the cell state upon verification of the cell state according to the user-specified constraints.

14. The system of claim 13, wherein for the verifying the one or more operating state changes, the operations further comprise:
    verifying a logic conflict during propagation of the cell state; and
    excluding the cell state that causes the logic conflict during propagation of the cell state.

15. The system of claim 11, wherein for the generating the analysis report, the operations further comprise generating the analysis report in a value change dump (VCD) format or a fast signal data base (FSDB) format.

16. The system of claim 11, wherein the user-specified constraints comprises high fan out (HFN), reset logic, and integrated clock gating (ICG) efficiency.

17. The system of claim 11, wherein for the generating the analysis report, the operations comprise generating the analysis report for one or more clock cycles of a plurality of clock cycles.

18. The system of claim 17, wherein two or more clock cycles of the plurality of clock cycles are non consecutive.

19. A non-transitory, tangible computer-readable device having instructions stored thereon
    that, when executed by at least one computing device, causes the at least one computing device to perform operations for operating state analysis of an integrated circuit (IC) design, the operations comprising:

simulating a switching operation from a first operating state to a second operating state for one or more cells of the IC design using a plurality of vectors corresponding to one or more user-specified constraints;

generating a time-based waveform for each cell of the one or more cells of the IC design changing an operating state from the first operating state to the second operating state during the switching operation;

based on the generated time-based waveform, identifying one or more operating state changes by the each cell of the one or more cells of the IC design corresponding to the operating state analysis and associated timing window and cell information;

verifying the one or more operating state changes by the each cell of the one or more cells of the IC design meet the one or more user-specified constraints; and generating an analysis report for a clock cycle comprising a subset of the plurality of vectors corresponding to the verified one or more operating state changes by the each cell of the one or more cells of the IC design.

* * * * *